US010609411B1

United States Patent
(12) United States Patent
Cheong et al.

(10) Patent No.: US 10,609,411 B1
(45) Date of Patent: Mar. 31, 2020

(54) CROSS COLOR PREDICTION FOR IMAGE/VIDEO COMPRESSION

(71) Applicant: Sony Corporation, Tokyo (JP)

(72) Inventors: Hye-Yeon Cheong, Los Gatos, CA (US); Ali Tabatabai, Cupertino, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/194,358

(22) Filed: Nov. 18, 2018

(51) Int. Cl.

| | |
|---|---|
| *H04N 19/593* | (2014.01) |
| *H04N 19/176* | (2014.01) |
| *H04N 19/186* | (2014.01) |
| *H04N 19/124* | (2014.01) |
| *H04N 19/147* | (2014.01) |
| *H04N 19/184* | (2014.01) |

(52) U.S. Cl.
CPC ......... *H04N 19/593* (2014.11); *H04N 19/124* (2014.11); *H04N 19/147* (2014.11); *H04N 19/176* (2014.11); *H04N 19/184* (2014.11); *H04N 19/186* (2014.11)

(58) Field of Classification Search
CPC ... H04N 19/593; H04N 19/176; H04N 19/186
See application file for complete search history.

(56) References Cited

U.S. PATENT DOCUMENTS

| | | | | |
|---|---|---|---|---|
| 6,785,425 | B1 * | 8/2004 | Feder | H04N 1/648 375/E7.265 |
| 8,107,749 | B2 | 1/2012 | Birinov et al. | |
| 9,716,889 | B2 | 7/2017 | Ikeda | |
| 2011/0255780 | A1 * | 10/2011 | Hsieh | G06T 3/4015 382/167 |
| 2013/0128974 | A1 * | 5/2013 | Chien | H04N 19/105 375/240.15 |
| 2016/0165236 | A1 * | 6/2016 | Ikeda | H04N 19/159 375/240.13 |
| 2019/0222837 | A1 * | 7/2019 | Lee | H04N 19/117 |

* cited by examiner

*Primary Examiner* — Shawn S An
(74) *Attorney, Agent, or Firm* — Haverstock & Owens LLP

(57) ABSTRACT

To improve intra coding prediction, cross-color prediction utilizes spatial correlation and cross-color correlation to generate a more accurate predictor. Cross-color prediction is also able to be used in a dynamic system which selects between cross-color prediction and intra-color prediction.

18 Claims, 5 Drawing Sheets

| | Intra-color Pred. | Cross-color Pred. | Both Intra-color + cross-color Pred. |
|---|---|---|---|
| Natural Content | 45.2 | 53.6 | 53.8 |
| Graphics Content | 65.7 | 77.1 | 77.8 |

CROSS COLOR PREDICTION FOR IMAGE/VIDEO COMPRESSION

FIELD OF THE INVENTION

The present invention relates to video coding. More specifically, the present invention relates to image/video compression.

BACKGROUND OF THE INVENTION

Video coding includes quantization, Differential Pulse-Code Modulation (DPCM), entropy coding and refinement. Entropy coding is a lossless data compression scheme which compresses data by replacing each fixed-length input symbol with the corresponding variable-length prefix-free output codeword.

SUMMARY OF THE INVENTION

To improve intra coding prediction, cross-color prediction utilizes spatial correlation and cross-color correlation to generate a more accurate predictor. Cross-color prediction is also able to be used in a dynamic system which selects between cross-color prediction and intra-color prediction.

In one aspect, a method programmed in a non-transitory memory of a device comprises determining a pixel prediction based on a spatially correlated intra-color predictor pixel and one or more predictor residuals and utilizing the pixel prediction for intra coding. Determining the pixel prediction includes: determining a first predictor by adding a first color component of the spatially correlated intra-color predictor pixel to a predictor residual of a second color component, wherein the predictor residual is determined by subtracting the second color component of the spatially correlated intra-color predictor pixel from the second color component of the current pixel, determining a second predictor which is equal to the second color component of the spatially correlated intra-color predictor pixel and determining a third predictor by adding a third color component of the spatially correlated intra-color predictor pixel to a predictor residual of the second color component, wherein the predictor residual is determined by subtracting the second color component of the spatially correlated intra-color predictor pixel from the second color component of the current pixel. The first color component is red, the second color component is green, and the third color component is blue. The second color component changes block by block of an image. The method further comprises adaptively selecting between: determining the pixel prediction based on the spatially correlated intra-color predictor pixel and the one or more predictor residuals, and determining the pixel prediction based on the spatially correlated intra-color predictor pixel. Determining the pixel prediction utilizes a weighted sum. Determining the pixel prediction is for a Bayer image.

In another aspect, an apparatus comprises a non-transitory memory for storing an application, the application for: determining a pixel prediction based on a spatially correlated intra-color predictor pixel and one or more predictor residuals and utilizing the pixel prediction for intra coding and a processor coupled to the memory, the processor configured for processing the application. Determining the pixel prediction includes: determining a first predictor by adding a first color component of the spatially correlated intra-color predictor pixel to a predictor residual of a second color component, wherein the predictor residual is determined by subtracting the second color component of the spatially correlated intra-color predictor pixel from the second color component of the current pixel, determining a second predictor which is equal to the second color component of the spatially correlated intra-color predictor pixel and determining a third predictor by adding a third color component of the spatially correlated intra-color predictor pixel to a predictor residual of the second color component, wherein the predictor residual is determined by subtracting the second color component of the spatially correlated intra-color predictor pixel from the second color component of the current pixel. The first color component is red, the second color component is green, and the third color component is blue. The second color component changes block by block of an image. The apparatus further comprises adaptively selecting between: determining the pixel prediction based on the spatially correlated intra-color predictor pixel and the one or more predictor residuals, and determining the pixel prediction based on the spatially correlated intra-color predictor pixel. Determining the pixel prediction utilizes a weighted sum. Determining the pixel prediction is for a Bayer image.

In another aspect, a system comprises a first computing device configured for: determining a pixel prediction based on a spatially correlated intra-color predictor pixel and one or more predictor residuals and utilizing the pixel prediction for intra coding to encode content and a second computing device configured for: decoding the encoded content. Determining the pixel prediction includes: determining a first predictor by adding a first color component of the spatially correlated intra-color predictor pixel to a predictor residual of a second color component, wherein the predictor residual is determined by subtracting the second color component of the spatially correlated intra-color predictor pixel from the second color component of the current pixel, determining a second predictor which is equal to the second color component of the spatially correlated intra-color predictor pixel and determining a third predictor by adding a third color component of the spatially correlated intra-color predictor pixel to a predictor residual of the second color component, wherein the predictor residual is determined by subtracting the second color component of the spatially correlated intra-color predictor pixel from the second color component of the current pixel. The first color component is red, the second color component is green, and the third color component is blue. The second color component changes block by block of an image. The system further comprises adaptively selecting between: determining the pixel prediction based on the spatially correlated intra-color predictor pixel and the one or more predictor residuals and determining the pixel prediction based on the spatially correlated intra-color predictor pixel. Determining the pixel prediction utilizes a weighted sum. Determining the pixel prediction is for a Bayer image.

DETAILED DESCRIPTION OF THE PREFERRED EMBODIMENT

To improve a coder/decoder ("codec"), cross-color prediction is able to be used for intra coding prediction which is used in entropy coding. Entropy coding is binarization utilized to compress data, and the compression is able to be performed block by block. For example, a 16×2 image block is encoded such that the result includes header bits, entropy coded bits and refinement bits.

As is known for codecs, an encoder performs prediction, transform and encoding steps to generate a compressed bitstream, and a decoder implements decoding, inverse transform and reconstruction to generate a decoded video (or other content). During prediction, the encoder processes a frame of a video (a macroblock), to generate a prediction of the macroblock based on previously coded data.

Figure 1:
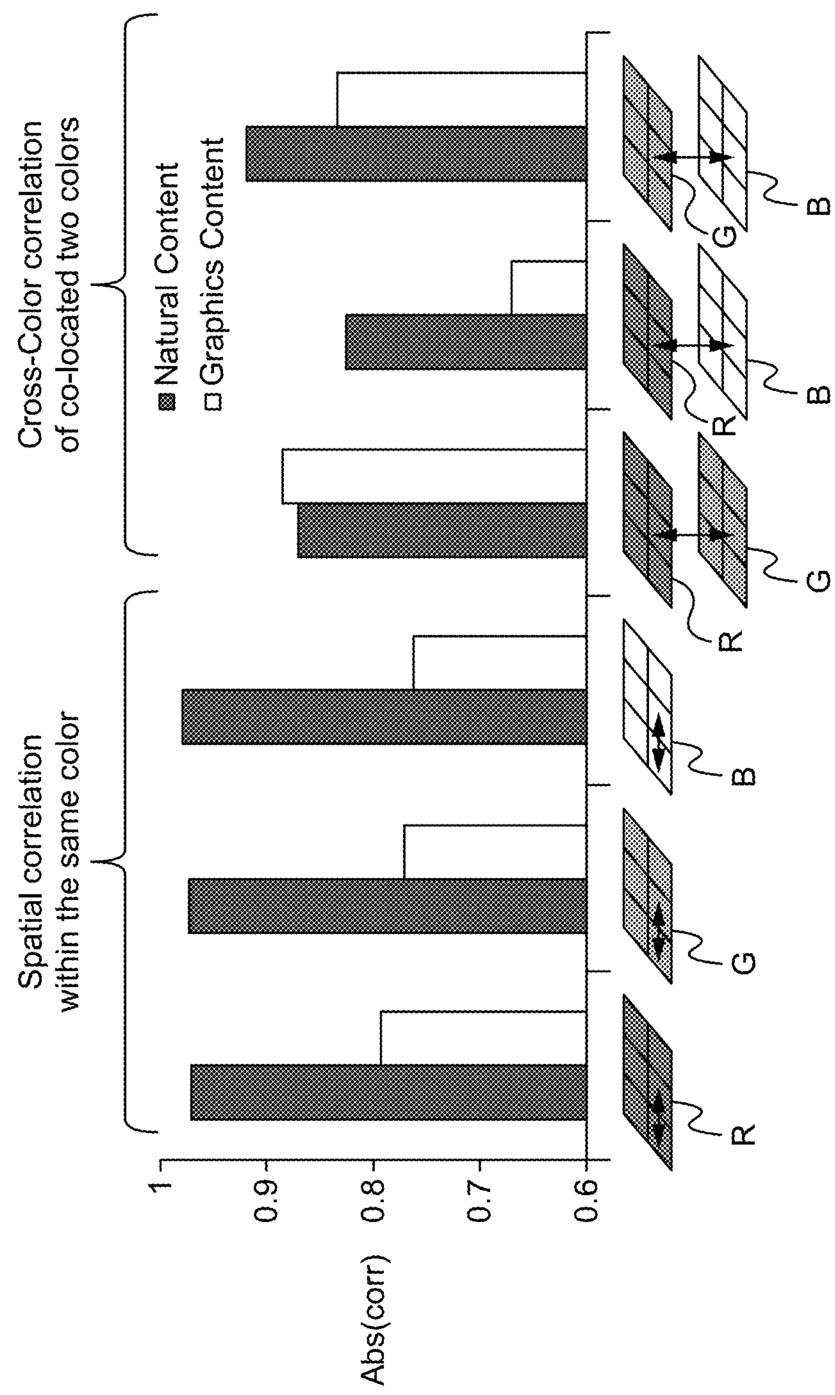
FIG. 1 illustrates a graph of color correlation according to some embodiments.

FIG. 1 illustrates a graph of color correlation according to some embodiments. The left bars (without hatching) of the graph are for natural content (e.g., a picture or video taken with a camera), and the right bars (with hatching) are for graphics content (e.g., computer-generated graphics). As is shown, the spatial correlation within the same color (e.g., red pixels next to each other) is very high for natural content, but not as high for graphics content. For cross-color correlation of co-located two colors (e.g., a red pixel neighboring a green pixel), red and green is high (almost 0.9), and green and blue is also high (over 0.9 for natural content and over 0.8 for graphics content). However, the correlation for red and blue, particularly for graphics content, is relatively low (less than 0.7). Therefore, by exploiting the spatial correlation within the same color and the cross-color correlation of two co-located colors, better color prediction is able to be implemented.

Figure 2:
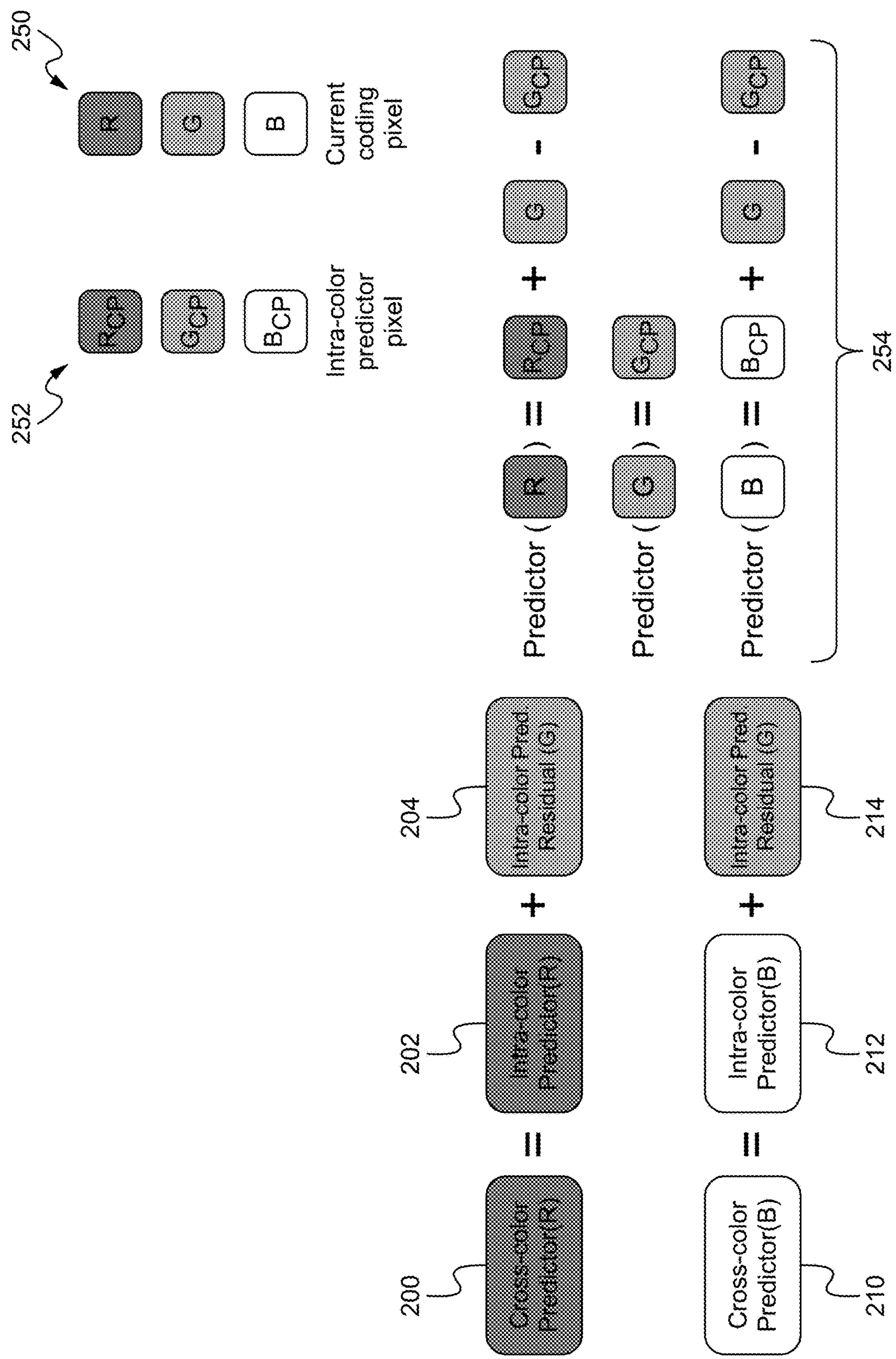
FIG. 2 illustrates a diagram of a cross-color prediction model according to some embodiments.

FIG. 2 illustrates a diagram of a cross-color prediction model according to some embodiments. For example, in RGB, when green is used as a reference color, the cross-color predictor (R) 200 is equal to the intra-color predictor (R) 202 (e.g., the spatial correlation for Red) plus the intra-color predictor residual (G) 204, where the intra-color predictor residual is the difference between the current pixel of that color (e.g., G) and the intra-color predictor pixel of that color (e.g., G). The cross-color predictor (B) 210 is equal to the intra-color predictor (B) 212 plus the intra-color predictor residual (G) 214. Although green is used as a reference color in this example, any color is able to be used as a reference color, e.g., red or blue (or another color if a different color format/scheme is used).

In another example, the current coding pixel is represented as R, G or B 250. The intra-color predictor pixel is represented as $R_{CP}$, $G_{CP}$ or $B_{CP}$ 252, e.g., based on spatial correlation. For example, the current pixel is R, and a neighboring pixel is $R_{CP}$. Then to predict the predictor 254 of each color component:

$$\text{Predictor }(R)=R_{CP}+G-G_{CP};$$

$$\text{Predictor }(G)=G_{CP};$$

$$\text{Predictor }(B)=B_{CP}+G-G_{CP}.$$

The cross-color prediction model is able to be used with other prediction schemes, and a scheme is able to be selected.

In some embodiments, variations of the cross-color prediction are implemented. For example, the reference color is able to be different block by block or is able to be set as one color for simplicity. For each block, a system is able to adaptively choose either an intra-color predictor or a cross-color predictor. The implementation described herein is able to be generalized to other image formats (e.g., Bayer image). A generalized formulation of adaptation is able to be performed by: weighted sum of "intra-color predictor" and "intra-color predictor residual," e.g., (intra-color predictor)+a (intra-color predictor residual) where a is able to vary between 0 to 1.

Figure 3:
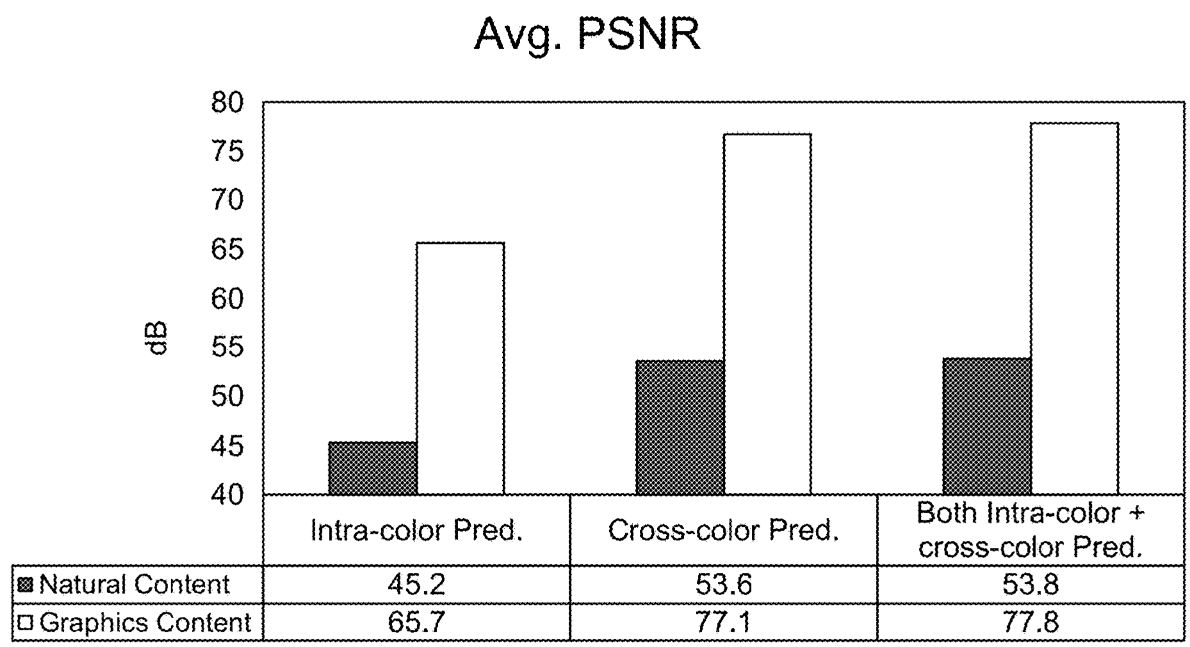
FIG. 3 illustrates a chart of a comparison of results according to some embodiments.

FIG. 3 illustrates a chart of a comparison of results according to some embodiments. In the exemplary results, an RBG image was used with a fixed reference color (green). The intra-color prediction performed the worst. Cross-color prediction performed very well, and adaptive selection of intra-color and cross-color prediction performed slightly better than only cross-color prediction. In the adaptive selection, 1 bit per block is used to signal which implementation was selected—either an intra-color predictor or a cross-color predictor.

Figure 4:
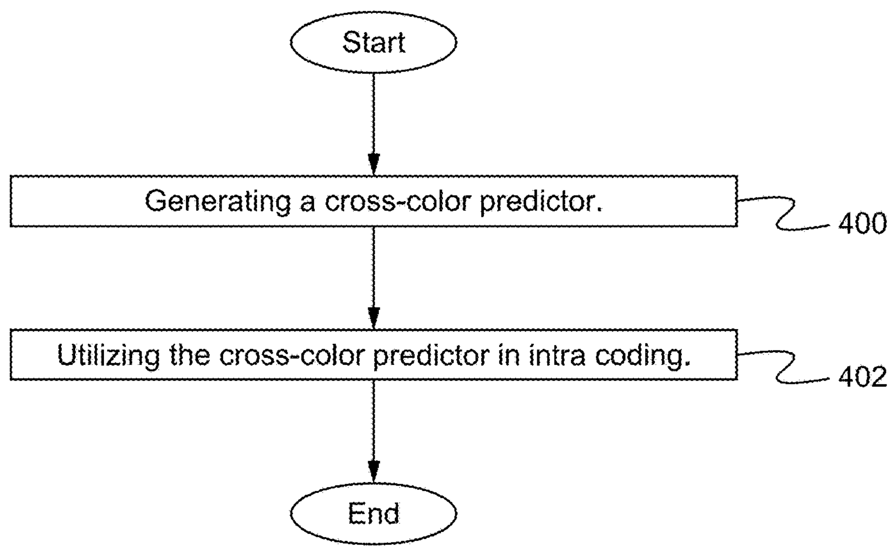
FIG. 4 illustrates a flowchart of a method of implementing cross-color prediction according to some embodiments.

FIG. 4 illustrates a flowchart of a method of implementing cross-color prediction according to some embodiments. In the step 400, a cross-color predictor is generated. Generating the cross-color predictor includes selecting a reference color, adding an intra-color predictor and an intra-color predictor residual, wherein the intra-color predictor residual is the current coding pixel of the reference color minus the intra-color predictor pixel of the reference color. In an example, color components are predicted:

$$\text{Predictor }(R)=R_{CP}+G-G_{CP};$$

$$\text{Predictor }(G)=G_{CP};$$

$$\text{Predictor }(B)=B_{CP}+G-G_{CP}.$$

In the step 402, the cross-color predictor is utilized in intra coding. In some embodiments, additional steps are implemented. For example, the reference color is selected for each block or is set as one fixed color. In another example, for each block of the image, the intra-color predictor or the cross-color predictor is adaptively selected. In another example, a generalized formulation of adaptation is able to be performed by weighted sum of "intra-color predictor" and "intra-color predictor residual," e.g., (intra-color predictor)+a (intra-color predictor residual) where a is able to vary between 0 to 1. In some embodiments, the order of the steps is modified. The steps of intra coding are not described in detail as they are well understood in the art.

Figure 5:
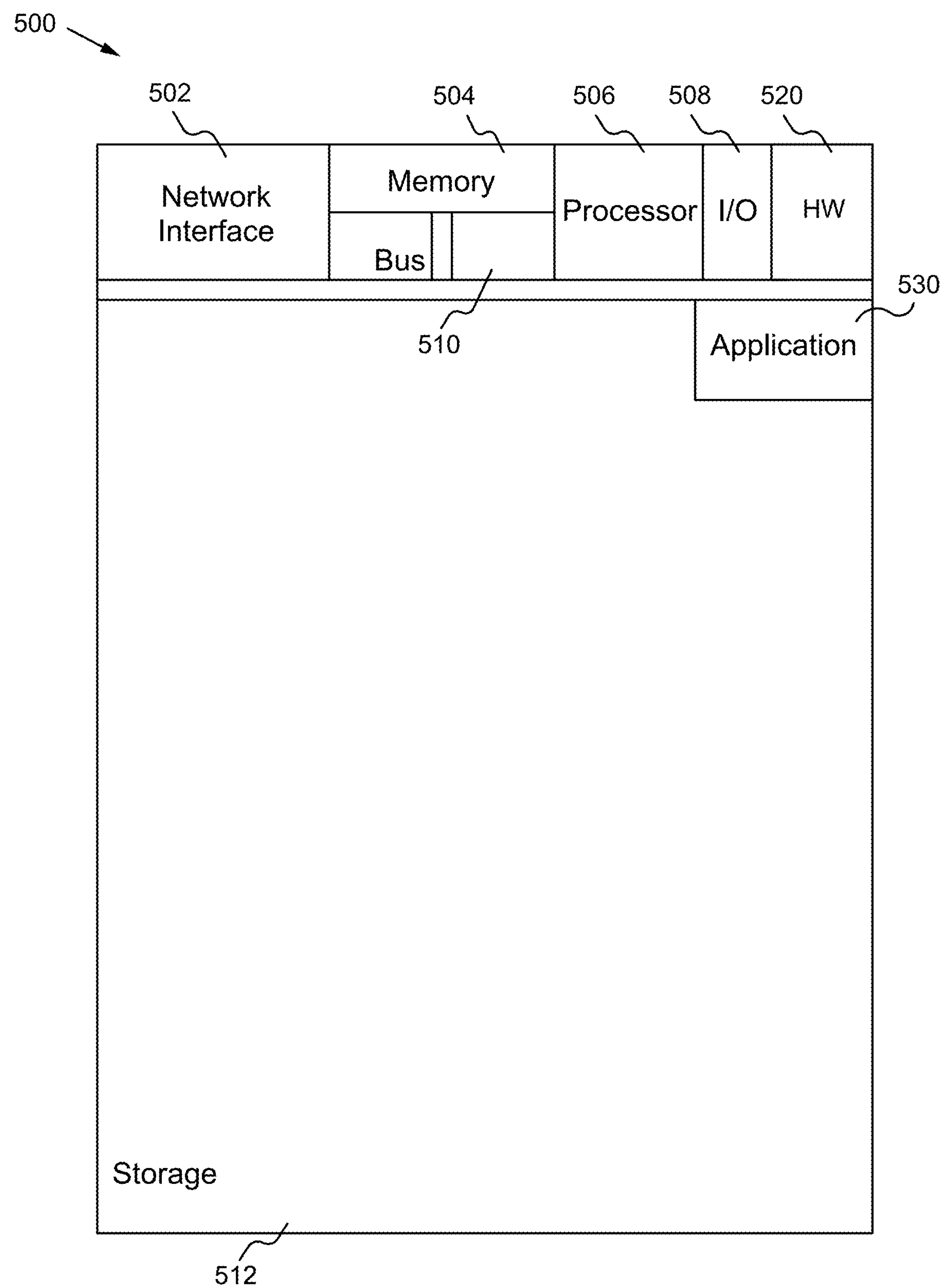
FIG. 5 illustrates a block diagram of an exemplary computing device configured to implement the cross-color prediction method according to some embodiments.

FIG. 5 illustrates a block diagram of an exemplary computing device configured to implement the cross-color prediction method according to some embodiments. The computing device 500 is able to be used to acquire, store, compute, process, communicate and/or display information such as images and videos. The computing device 500 is able to implement any of the cross-color prediction method aspects such as encoding and/or decoding. In general, a hardware structure suitable for implementing the computing device 500 includes a network interface 502, a memory 504, a processor 506, I/O device(s) 508, a bus 510 and a storage device 512. The choice of processor is not critical as long as a suitable processor with sufficient speed is chosen. The memory 504 is able to be any conventional computer memory known in the art. The storage device 512 is able to include a hard drive, CDROM, CDRW, DVD, DVDRW, High Definition disc/drive, ultra-HD drive, flash memory card or any other storage device. The computing device 500 is able to include one or more network interfaces 502. An example of a network interface includes a network card connected to an Ethernet or other type of LAN. The I/O device(s) 508 are able to include one or more of the following: keyboard, mouse, monitor, screen, printer, modem, touchscreen, button interface and other devices. Cross-color prediction application(s) 530 used to implement the cross-color prediction method are likely to be stored in the storage device 512 and memory 504 and processed as applications are typically processed. More or fewer components shown in FIG. 5 are able to be included in the computing device 500. In some embodiments, cross-color prediction hardware 520 is included. Although the computing device 500 in FIG. 5 includes applications 530 and hardware 520 for the cross-color prediction method, the cross-color prediction method is able to be implemented on a computing device in hardware, firmware, software or any combination thereof. For example, in some embodiments, the cross-color prediction applications 530 are programmed in a memory and executed using a processor. In another example, in some embodiments, the cross-color prediction hardware 520 is programmed hardware logic including gates specifically designed to implement the cross-color prediction method.

In some embodiments, the cross-color prediction application(s) 530 include several applications and/or modules. In some embodiments, modules include one or more submodules as well. In some embodiments, fewer or additional modules are able to be included.

In some embodiments, the cross-color prediction hardware 520 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

Figure 6:
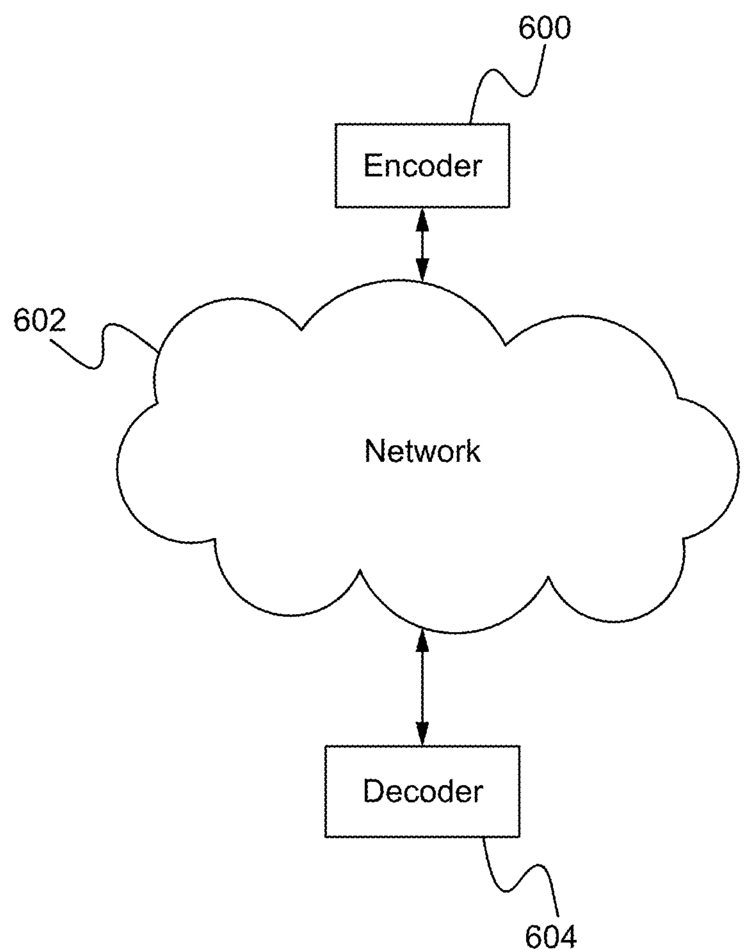
FIG. 6 illustrates a diagram of a network of devices according to some embodiments.

FIG. 6 illustrates a diagram of a network of devices according to some embodiments. Video content is encoded at one or more encoder devices 600. The encoded content is transmitted/streamed through a network 602 (e.g., the Internet, a cellular network or any other network) to one or more decoder devices 604. In some embodiments, the content is transmitted to the one or more decoder devices 604 directly without a network. The one or more devices of the network of devices (e.g., encoder device, decoder device) are configured to perform the cross-color prediction method described herein. The one or more encoder devices 600 and the one or more decoder devices 604 are able to be any device such as servers, a personal computers, smart phones, televisions, gaming systems, vehicles or any of the devices described herein or any combination of devices described herein.

To utilize the cross-color prediction method described herein, devices such as digital cameras/camcorders are used to acquire content. The cross-color prediction method is able to be implemented with user assistance or automatically without user involvement to efficiently encode, transmit, and decode content.

In operation, the cross-color prediction method more efficiently and more correctly encodes content. Specifically, as shown in the results, compared with intra-color prediction, the average peak signal-to-noise ratio is much higher using the cross-color prediction method or the adaptive cross-color prediction method.

Some Embodiments of Cross Color Prediction for Image/Video Compression

1. A method programmed in a non-transitory memory of a device comprising:

determining a pixel prediction based on a spatially correlated intra-color predictor pixel and one or more predictor residuals; and utilizing the pixel prediction for intra coding.

2. The method of clause 1 wherein determining the pixel prediction includes:

determining a first predictor by adding a first color component of the spatially correlated intra-color predictor pixel to a predictor residual of a second color component, wherein the predictor residual is determined by subtracting the second color component of the spatially correlated intra-color predictor pixel from the second color component of the current pixel;

determining a second predictor which is equal to the second color component of the spatially correlated intra-color predictor pixel; and determining a third predictor by adding a third color component of the spatially correlated intra-color predictor pixel to a predictor residual of the second color component, wherein the predictor residual is determined by subtracting the second color component of the spatially correlated intra-color predictor pixel from the second color component of the current pixel.

3. The method of clause 2 wherein the first color component is red, the second color component is green, and the third color component is blue.

4. The method of clause 2 wherein the second color component changes block by block of an image.

5. The method of clause 1 further comprising adaptively selecting between:

determining the pixel prediction based on the spatially correlated intra-color predictor pixel and the one or more predictor residuals, and determining the pixel prediction based on the spatially correlated intra-color predictor pixel.

6. The method of clause 1 wherein determining the pixel prediction utilizes a weighted sum.

7. The method of clause 1 wherein determining the pixel prediction is for a Bayer image.

8. An apparatus comprising:

a non-transitory memory for storing an application, the application for:

determining a pixel prediction based on a spatially correlated intra-color predictor pixel and one or more predictor residuals; and utilizing the pixel prediction for intra coding; and a processor coupled to the memory, the processor configured for processing the application.

9. The apparatus of clause 8 wherein determining the pixel prediction includes:

determining a first predictor by adding a first color component of the spatially correlated intra-color predictor pixel to a predictor residual of a second color component, wherein the predictor residual is determined by subtracting the second color component of the spatially correlated intra-color predictor pixel from the second color component of the current pixel;

determining a second predictor which is equal to the second color component of the spatially correlated intra-color predictor pixel; and determining a third predictor by adding a third color component of the spatially correlated intra-color predictor pixel to a predictor residual of the second color component, wherein the predictor residual is determined by subtracting the second color component of the spatially correlated intra-color predictor pixel from the second color component of the current pixel.

10. The apparatus of clause 9 wherein the first color component is red, the second color component is green, and the third color component is blue.

11. The apparatus of clause 9 wherein the second color component changes block by block of an image.

12. The apparatus of clause 8 further comprising adaptively selecting between:

determining the pixel prediction based on the spatially correlated intra-color predictor pixel and the one or more predictor residuals, and determining the pixel prediction based on the spatially correlated intra-color predictor pixel.

13. The apparatus of clause 8 wherein determining the pixel prediction utilizes a weighted sum.

14. The apparatus of clause 8 wherein determining the pixel prediction is for a Bayer image.

15. A system comprising:

a first computing device configured for:

determining a pixel prediction based on a spatially correlated intra-color predictor pixel and one or more predictor residuals; and utilizing the pixel prediction for intra coding to encode content; and a second computing device configured for:

decoding the encoded content.

16. The system of clause 15 wherein determining the pixel prediction includes:

determining a first predictor by adding a first color component of the spatially correlated intra-color predictor pixel to a predictor residual of a second color component, wherein the predictor residual is determined by subtracting the second color component of the spatially correlated intra-color predictor pixel from the second color component of the current pixel;

determining a second predictor which is equal to the second color component of the spatially correlated intra-color predictor pixel; and determining a third predictor by adding a third color component of the spatially correlated intra-color predictor pixel to a predictor residual of the second color component, wherein the predictor residual is determined by subtracting the second color component of the spatially correlated intra-color predictor pixel from the second color component of the current pixel.

17. The system of clause 16 wherein the first color component is red, the second color component is green, and the third color component is blue.

18. The system of clause 16 wherein the second color component changes block by block of an image.

19. The system of clause 15 further comprising adaptively selecting between:

determining the pixel prediction based on the spatially correlated intra-color predictor pixel and the one or more predictor residuals, and determining the pixel prediction based on the spatially correlated intra-color predictor pixel.

20. The system of clause 15 wherein determining the pixel prediction utilizes a weighted sum.

21. The system of clause 15 wherein determining the pixel prediction is for a Bayer image.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:

determining a pixel prediction based on a spatially correlated intra-color predictor pixel and one or more predictor residuals, wherein determining the pixel prediction includes:

determining a first predictor by adding a first color component of the spatially correlated intra-color predictor pixel to a predictor residual of a second color component, wherein the predictor residual is determined by subtracting the second color component of the spatially correlated intra-color predictor pixel from the second color component of the current pixel;

determining a second predictor which is equal to the second color component of the spatially correlated intra-color predictor pixel; and determining a third predictor by adding a third color component of the spatially correlated intra-color predictor pixel to a predictor residual of the second color component, wherein the predictor residual is determined by subtracting the second color component of the spatially correlated intra-color predictor pixel from the second color component of the current pixel; and utilizing the pixel prediction for intra coding.

2. The method of claim 1 wherein the first color component is red, the second color component is green, and the third color component is blue.

3. The method of claim 1 wherein the second color component changes block by block of an image.

4. The method of claim 1 further comprising adaptively selecting between:

determining the pixel prediction based on the spatially correlated intra-color predictor pixel and the one or more predictor residuals, and determining the pixel prediction based on the spatially correlated intra-color predictor pixel.

5. The method of claim 1 wherein determining the pixel prediction utilizes a weighted sum.

6. The method of claim 1 wherein determining the pixel prediction is for a Bayer image.

7. An apparatus comprising:

a non-transitory memory for storing an application, the application for:

determining a pixel prediction based on a spatially correlated intra-color predictor pixel and one or more predictor residuals, wherein determining the pixel prediction includes:

determining a first predictor by adding a first color component of the spatially correlated intra-color predictor pixel to a predictor residual of a second color component, wherein the predictor residual is determined by subtracting the second color component of the spatially correlated intra-color predictor pixel from the second color component of the current pixel;

determining a second predictor which is equal to the second color component of the spatially correlated intra-color predictor pixel; and determining a third predictor by adding a third color component of the spatially correlated intra-color predictor pixel to a predictor residual of the second color component, wherein the predictor residual is determined by subtracting the second color component of the spatially correlated intra-color predictor pixel from the second color component of the current pixel; and utilizing the pixel prediction for intra coding; and a processor coupled to the memory, the processor configured for processing the application.

8. The apparatus of claim 7 wherein the first color component is red, the second color component is green, and the third color component is blue.

9. The apparatus of claim 7 wherein the second color component changes block by block of an image.

10. The apparatus of claim 7 further comprising adaptively selecting between:

determining the pixel prediction based on the spatially correlated intra-color predictor pixel and the one or more predictor residuals, and determining the pixel prediction based on the spatially correlated intra-color predictor pixel.

11. The apparatus of claim 7 wherein determining the pixel prediction utilizes a weighted sum.

12. The apparatus of claim 7 wherein determining the pixel prediction is for a Bayer image.

13. A system comprising:

a first computing device configured for:

determining a pixel prediction based on a spatially correlated intra-color predictor pixel and one or more predictor residuals, wherein determining the pixel prediction includes:

determining a first predictor by adding a first color component of the spatially correlated intra-color predictor pixel to a predictor residual of a second color component, wherein the predictor residual is determined by subtracting the second color component of the spatially correlated intra-color predictor pixel from the second color component of the current pixel;

determining a second predictor which is equal to the second color component of the spatially correlated intra-color predictor pixel; and determining a third predictor by adding a third color component of the spatially correlated intra-color predictor pixel to a predictor residual of the second color component, wherein the predictor residual is determined by subtracting the second color component of the spatially correlated intra-color predictor pixel from the second color component of the current pixel; and utilizing the pixel prediction for intra coding to encode content; and a second computing device configured for:

decoding the encoded content.

14. The system of claim 13 wherein the first color component is red, the second color component is green, and the third color component is blue.

15. The system of claim 13 wherein the second color component changes block by block of an image.

16. The system of claim 13 further comprising adaptively selecting between:

determining the pixel prediction based on the spatially correlated intra-color predictor pixel and the one or more predictor residuals, and determining the pixel prediction based on the spatially correlated intra-color predictor pixel.

17. The system of claim 13 wherein determining the pixel prediction utilizes a weighted sum.

18. The system of claim 13 wherein determining the pixel prediction is for a Bayer image.

* * * * *